Feb. 26, 1957 F. H. RUED 2,782,768
GOVERNOR FOR A WATER WHEEL
Filed Sept. 14, 1953 4 Sheets-Sheet 2

INVENTOR.
FRED H. RUED
BY
ATTORNEY

INVENTOR.
FRED H. RUED
BY Marcus Lothrop
ATTORNEY

Feb. 26, 1957  F. H. RUED  2,782,768
GOVERNOR FOR A WATER WHEEL
Filed Sept. 14, 1953  4 Sheets-Sheet 4

INVENTOR.
FRED H. RUED
BY
ATTORNEY

United States Patent Office 2,782,768
Patented Feb. 26, 1957

2,782,768
GOVERNOR FOR A WATER WHEEL

Fred H. Rued, Lafayette, Calif., assignor, by mesne assignments, to Baldwin-Lima-Hamilton Corporation, Philadelphia, Pa., a corporation of Pennsylvania Application September 14, 1953, Serial No. 380,075

4 Claims. (Cl. 121—42)

My invention is especially concerned with a governor for regulating the speed of rotation of driving machinery, particularly hydraulic driving machinery utilized in connection with electric generators.

It is customary to interrelate a number of hydroelectric power generation stations in order to maintain the production of electric power under certain closely specified conditions. The electrical load on the system varies a great deal from time to time, sometimes gradually and sometimes most abruptly. The frequency of the electricity generated is desirably held within extremely close limits and that requires the speed of the hydraulic driving units for the generators also to be held within equally close limits. The hydraulic driving machinery is customarily in the turbine or water wheel category and the term "water wheel" is utilized herein to include any fluid actuated rotary driving element whether technically a turbine or an impulse wheel and is equally inclusive of other fluids such as vapor or gas.

In the example chosen, the speed of rotation of the water wheel is regulated by control of the admission of the driving water to the wheel. This is customarily accomplished either through nozzles, gates or wickets, or by varying the turbine blade angles or some other equally effective means. Since the control instrumentalities are quite massive in most installations, it is usual to move them for regulation purposes through the medium of a main servo mechanism. This is usually a cylinder and piston arrangement driven hydraulically; for example, by oil under pressure. If the hydraulic main servo mechanism is carefully regulated the resulting speed of the water wheel is equally carefully regulated and so the resulting generation of current is carefully held within the specifications.

If the size of the units and the amount of propulsive liquid available and other characteristics were such that an unlimited variation were possible, then it would be feasible to control any load with a precisely corresponding speed. In practice, however, some of these values have limits very close to the operating norms of the structure so that it is permissible under increase of load of a substantial amount to allow the speed of the rotary apparatus to drop from its desired value in a small amount. This reduction in speed is referred to as speed "droop" and is often expressed as a percentage of the designed rotary speed of the mechanism.

In hydroelectric plants, it is often necessary to regulate the amount of water used for power generation to some amount dependent on another factor, such as an irrigation load or a necessary minimum or maximum stream release. That is accomplished by establishing or fixing the amount which the regulating gates are permitted to open. For example, in a certain season of the year, it may be permissible to pass only a fraction of the maximum possible amount of water through the turbines and therefore it is necessary to limit the maximum gate opening to a fraction of that mechanically possible.

As another factor, it is often desired to operate a generator slightly above or slightly below the theoretical, designed governing speed because of varying events on the electrical network to which the generator may be connected. It is sometimes necessary to take a generating station off of the electrical network very quickly or to put it on the line very quickly. Under these circumstances, automatic operation of the driving water wheel is sometimes desired, and at other times, hand regulation is preferred.

It is therefore an object of my invention to provide a governor for a water wheel capable of meeting various practical requirements, some of which have been described.

Another object of the invention is to provide a governor for a water wheel which is effective to maintain the desired control within very close limits, yet in which a relatively simple mechanical construction is possible.

Another object of the invention is to provide a generally improved governor for water wheels.

A still further object of the invention is to provide a governor effective very quickly to respond to changed operating conditions and to changed requirements of operation so that an extremely flexible governing arrangement is provided.

A still further object of the invention is to provide a governor effective automatically and manually to control the speed of the water wheel.

A still further object of the invention is to provide a governor in which the speed droop, gate opening and other operating characteristics are held within the desired limits, yet can be varied at the will of the operator from time to time.

A still further object of the invention is to provide a governor which can be embodied in a compact, straightforward unit easily installed and readily inspected and serviced.

Other objects, together with the foregoing, are attained in the embodiment of the invention described in the accompanying description and illustrated in the drawings in which.

Figure 1:
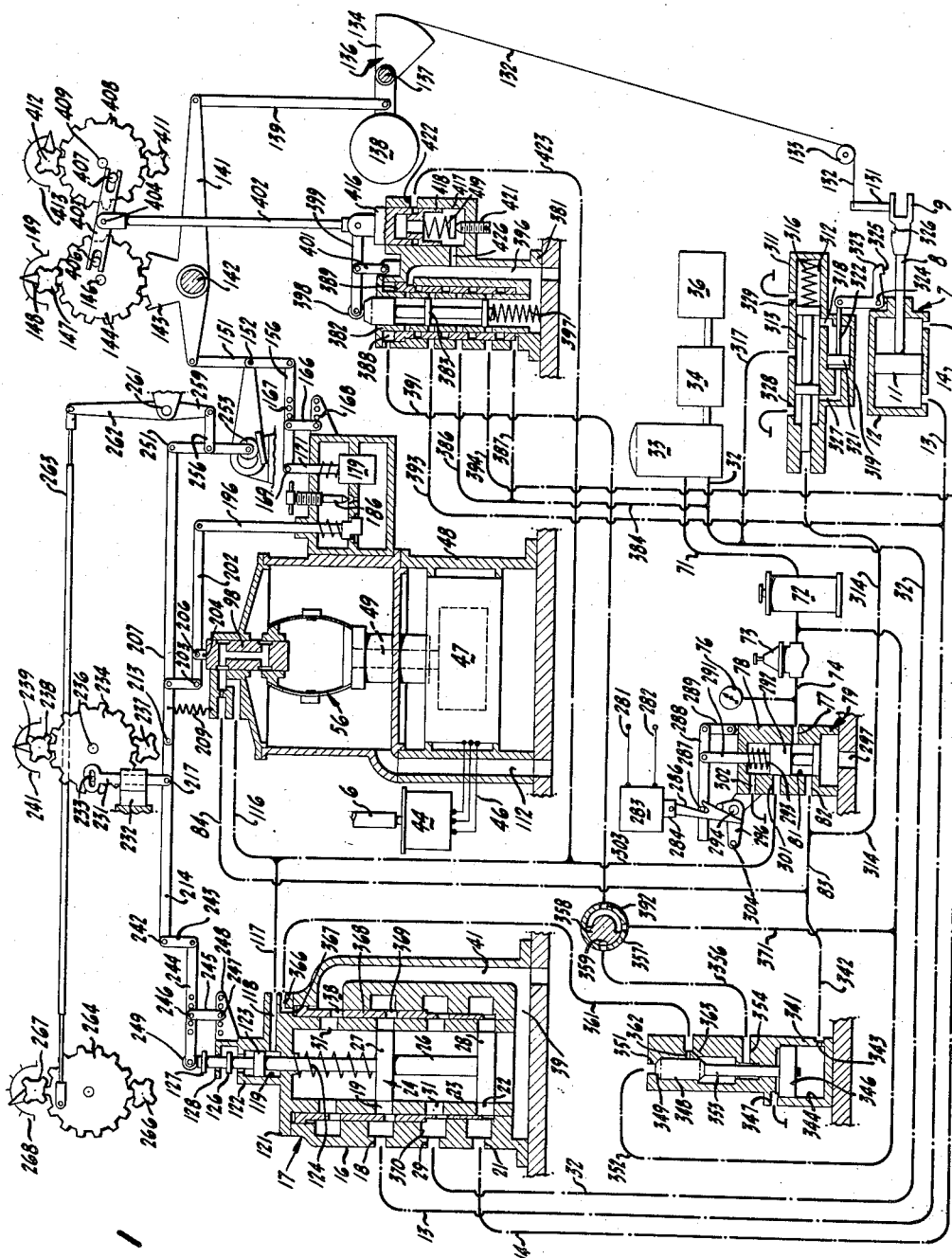
Figure 1 is a diagrammatic layout of a governor constructed in accordance with the invention.
Figure 2:
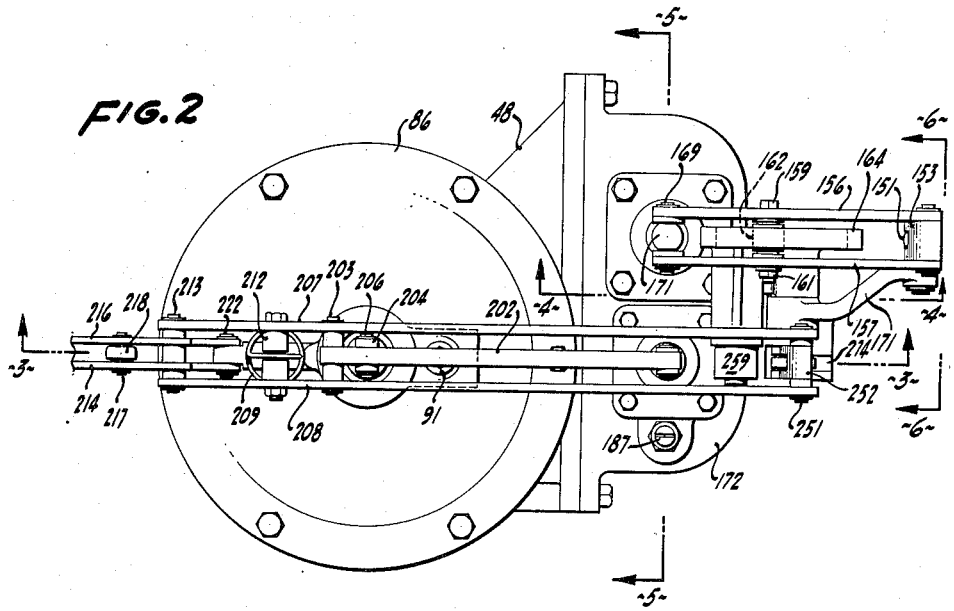
Figure 2 is a plan of part of an actual governor unit constructed in accordance with the invention.

Where differences in construction or arrangement appear between Figure 1 and the remaining figures, it is to be understood that Figure 1 is diagrammatic only and that the remaining figures more closely approximate the actual construction practically employed.

While the governor of the invention can be embodied in a number of different forms depending upon its environment and the desired characteristics, it has successfully been embodied as illustrated herein for application in connection with the operation of a water wheel driving a generator. These are not shown, but are illustrated by the common shaft 6 which serves as the rotary element of both the water wheel and the electric generator.

The water wheel, of which the shaft 6 is a part, is controlled as to its speed of operation ultimately by a main servo mechanism 7 which regulates nozzles, gates or wickets, not shown, controlling the water flow. This is accomplished by the movement of the piston rod 8 of the main servomotor which ends in a clevis 9 connected to appropriate mechanism for that purpose in the well known and customary fashion. A piston 11 on the piston rod 8 travels to and fro in a cylinder 12, being impelled one way or the other or hydraulically held in position, depending upon the amount of hydraulic liquid in the cylinder 12 on either side of the piston 11.

The hydraulic flow into and out of the main servomotor 7 is by means of pipes 13 and 14 extending to the casing 16 of a regulating valve generally designated 17. Within the regulating valve are aligned ports 18 and 19 for the pipe 13 and aligned ports 21 and 22 for the pipe 14. The ports 19 and 22 open into a central bore 23 in the regulating valve 17 within which a valve piston 24 is reciprocable. The valve piston includes a stem 26 and is effective in its various locations to control the flow from between lands 27 and 28 on the piston 24 and the ports 19 and 22. Flow into the space between the lands 27 and 28 occurs through a pair of aligned ports 29 and 31, serving to connect to a pressure pipe 32 joined to the casing 16 of the regulating valve 17.

The pressure pipe 32 extends to a pressure tank 33 conveniently located and containing a supply of hydraulic fluid under pressure. Usually oil substantially free of air and gas is utilized as the hydraulic fluid. The pressure tank 33 is supplied by a pumping set 34 usually electrically driven and taking oil from a sump 36 under atmospheric pressure. By the operation of the pumping unit 34, hydraulic fluid is taken from the sump 36, maintained under pressure in the pressure tank 33, and is supplied through the line 32 to the regulating valve 17.

As the stem 26 of the regulating valve moves up and down, pressure fluid is admitted to either the pipe 13 or the pipe 14 to displace the main servomotor piston 11 in a corresponding direction to control the nozzle, gate or wicket opening of the water wheel or turbine and thereby to control its speed. As the piston 11 moves in one direction, it displaces hydraulic fluid and such fluid is released over the ends of the lands 27 and 28 into the ends of the valve bore 23 from which it flows through aligned ports 37 and 38 or through a port 39 into a drain line 41, extending by a connection to the sump tank 36, thereby completing the hydraulic circuit. Consequently, movement of the stem 26 of the regulating valve 17 is directly respondent to by the main servomotor 7 and is a controlling factor for establishing the speed of rotation of the water wheel and turbine shaft 6.

The speed of rotation of the shaft 6 is sensed in order to provide a governing impulse. Conveniently, the shaft 6 drives an electric generator 44 joined by electrical conductors 46 to a synchronous electric motor 47 (Figures 1 and 3) disposed within a speed unit casing 48. The motor 47 is at one end of a drive shaft 49 appropriately supported in bearings 51 in the casing 48 and effective to rotate in exact synchronism with the rotation of the shaft 6. There is thus provided within the speed unit casing 48 a rotary shaft 49, the speed of which is a reflection of the speed of the water wheel and electric generator.

The shaft 49 emerges through suitable sealing devices 53 from the lower part of the casing 48 into an oil tight chamber 54 at the upper portion of the casing 48 and within which is disposed a flyball governor 56. This governor includes a hub 57 at the upper portion of the shaft 49 and carries a spider 58 at its outermost ends holding a removable guard cover 59. The spider 58 also serves as the support at one end of a number of flexible straps 61, preferably laminated, which are secured in position by removable fastenings 62. While two symmetrically disposed straps 61 are illustrated, it is customary in practice to utilize three equally spaced straps. Between their ends, the straps 61 are provided with augmenting weights 62 secured by fastenings 63. The other ends of the straps 61 are secured by fastenings 64 to a movable hub 66 carrying with it an anti-friction sleeve 67 in coaxial disposition with the shaft 49.

As the shaft 49 rotates under the driving influence of the motor 47, the weights 62 move radially outward as they revolve, in the customary fashion of a flyball governor, and flex the straps 61 in so doing. Since the lower spider 58 is held against axial translation by a cap structure 68 on the shaft 49, the radially outward motion of the weights 62 in effect shortens the straps 61 and moves the upper hub 66 in an axially downward direction as speed increases. This is the customary action of a flyball governor.

The guard 59 serves to confine the weights 62 to a maximum radially outward position and to confine them in the event of disruption of the apparatus.

In accordance with the invention, the axial translation of the sleeve 67 under the influence of the flyball governor is utilized as a governing impulse. Preferably, there is utilized a hydraulic circuit for performing the governing operations and the hydraulic circuit is controlled by the motion of the sleeve 67. For that reason, there is provided on the pressure tank 33 a conduit 71 which extends through an appropriate filter 72 and through a pressure regulator 73 set to maintain an established reduced pressure in a connecting conduit 74, the pressure being indicated by an appropriate gauge 76.

The conduit 74 is connected to a port 77 in the body 78 of a valve, generally designated 79, and communicates with an interior bore 81 in the body. A communicating port 82 extends from the central bore 81 to a conduit 83 connected to a supply conduit 84. The supply conduit 84 is fastened to the cap 86 on the housing 48 and opens into a port 87 merging with a bore 88 leading to a pressure passage 89, also within the cap 86. Within the passage 88 and between the port 87 and the conduit 89, is a restriction in the form of a plug 91. This plug is screwed into the cap 86, has a reduced stem 92 and terminates in a snugly fitting body 93 formed with a relatively small helical channel 94 around the periphery thereof. Flow from the passage 87 through the bore 88 into the conduit 89 is necessarily through the helical channel 94, since substantially no flow can occur around the tight fitting plug 93. The helical channel 94 therefore acts as a restriction or a restricted orifice of some length between the supply conduit 84 and the pressure passage 89.

The conduit 89 in the cap 86 extends to a relieved chamber 96 forming an enlargement in an axial bore 97 in the cap 86 in alignment with the shaft 49 and carrying a valve body 98 freely slidable therein. At its lower end, the valve body 98 extends into and serves as a pilot support for the antifriction sleeve 67 of the flyball governor 56. The valve body 98 is axially movable within the housing cap 86 and in all positions thereof communicates with the chamber 96 through a pair of cross bores 101 and 102 opening into a central passage 103 extending from the cross bores to the lower end of the valve body 98 where it is closed by a permanent plug 104. The passage 103 is intersected by cross passages 106 and 107 opening outwardly to a peripheral or circumferential groove 108 on the surface of the valve body and to which oil from the conduit 89 can flow since there is always communication between the groove 108 and the supply conduit 84 through the restriction 94. The restriction 94 is the smallest cross sectional area for flow between the supply conduit 84 and the groove 108.

The groove 108 is so located that it is near to enlarged ports 109 extending through the sleeve 67 and communicating with registering ports 111 in the hub 66 of the flyball governor. This structure is effective to provide a path of flow from the groove 108 through the ports 109 and 111 into the interior of the casing 48 which is maintained at atmospheric pressure and is connected to the sump tank 36 through a drain channel 112 and its connections of the customary sort, not shown in detail.

In some positions of the sleeve 67, the communication is free, as described, and in other positions the communication is blocked since the sleeve 67 in sliding upon the valve body 98 overlies the groove 108 and prevents flow therethrough. In intermediate positions of the sleeve 67, the area for discharge through the ports 109 is varied. By this means, the speed of the shafts 6 and 49 is made effective to move the sleeve 67 to cover and uncover in varying amounts the pressure passage 89 and its connections. Thus, the sleeve 67 and the body 96 constitute a balanced still valve so that the pressure within the passage 89 is variable in exact accordance with the speed of rotation of the shaft 6.

In other words, the pressure measured in the conduit 89 is an exact indication of the speed of rotation of the shaft 6. This regulation is extremely sensitive since a very slight variation in the position of the flyball weights 62 in response to a speed change makes a slight corresponding change in the position of the sleeve 67 on the valve body 98 and varies the area of egress of the pressure fluid. Since the supply through the orifice 94 is substantially constant due to the action of the pressure regulator 73 and to the flow characteristics of the orifice 94, the pressure within the conduit 89 correspondingly fluctuates in a very sensitive fashion in immediate and exact accord with variations of speed in the shaft 6. The pressure in the conduit 89 is therefore utilized as a governing factor.

The pressure passage 89 is connected by a conduit 116 and a line 117 to a port 118 all together serving as a duct opening into a bore 119 in a cap 121 on the regulating valve casing 16. The bore 119 serves as the cylindrical chamber of a pilot servo motor, generally designated 122, and including a piston 123 disposed on the stem 26 of the regulating valve and axially translatable within the bore 119. Close fitting parts provide against leakage between the chamber 119 and the interior of the regulating valve bore 23. Since the port 118 opens into the bore 119 beneath the piston 123, pressure in it is effective to tend to lift the piston against the opposite urgency of a spring 124 disposed within the bore 23 and resting against the land 27 and against the cap 121.

Since the pressure within the pressure passage, made up of the passage 103, the conduit 89, the pipe 117 and the port 118, is in exact accordance with the speed of the shaft 6, the location of the piston 123 then depends upon that pressure as compared with the strength of the spring 124. The upper end of the chamber 119 is open to the atmosphere around the stem 26 so that pressure fluctuations in the pressure passage 118 are effective to move the piston 123 in exact accordance therewith and so to position the lands 27 and 28 in exact accordance therewith.

The amount of movement of the regulating valve under the influence of the pilot servo piston 123 is limited by stop nuts 126 and 127 disposed on opposite sides of a datum bracket 128 extending upwardly from the cap 121. Since the stem 26 is axially translated in exact accordance with the pressure passage pressure, it correspondingly governs flow between the supply line 32 and the control pipes 13 and 14 for the main servomotor 7. Consequently, a change in speed of the shaft 6 produces a corresponding change in position of the water wheel gates under the influence of the main servomotor. The arrangement is such that as the speed of the water wheel increases over the set value, the gates are correspondingly closed and vice versa. Thus, there is provided in this fashion a general regulation of the turbine or water wheel speed by means of the flyball governor through the medium of the hydraulically sensitive flyball governor mechanism and the hydraulically actuated pilot servomotor and the main servomotor.

It is found in practice that the response of the water wheel to this governing situation is not sufficiently delicate and may even give rise to "hunting," an operation in which the water wheel alternately over-speeds and under-speeds in excessive amounts. For that reason, there is provided a feedback structure for sensing the position of the water wheel main servomotor and using that position to produce an effect upon the flyball governor. As illustrated diagrammatically in Figure 1, the piston rod clevis 9 has an extension 131 to which a flexible cable 132 is fastened. The cable is led around a pulley 133 and extends to a quadrant 134 on a transmission lever 136 provided with a suitable rotational axle 137. A counterweight 138 tends to maintain the cable 132 tight at all times. The position of the lever 136 therefore corresponds always with the position of the main servomotor piston rod 8 and the water wheel controlling gates.

Motion of the lever 136 is transmitted through a pivoted link 139 to a rocker lever 141 having a permanent fulcrum axle 142. The lever 141 is provided with a gear sector 143 meshing with a comparable gear wheel 144 suitably mounted on an axle 146 in a convenient location and transmitting its motion to an indicator gear 147 provided with a pointer 148 traveling over an indicating scale 149. By this motion train, the position of the water wheel controlling gates, or valves, or wickets, is made apparent to an observer looking at the needle 148 and the scale 149. When the needle 148 is at the left-hand end of the scale, as seen in Figure 1, the water wheel gates are closed, while when the needle 148 is in opposite extreme position the water wheel gates are fully open. In the position illustrated in Figure 1 the water wheel gates are one-half open.

Figure 6:
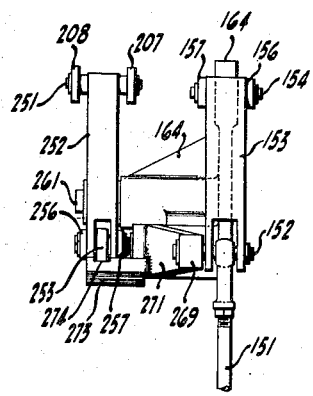
Figure 6 is a fragmentary end elevation of part of the governor structure, the view point being illustrated by the line 6—6 of Figure 2.

The end of the lever 141 is connected by a link 151 (Figures 1, 3 and 6) to a pivot shaft 152 at the lower end of a bifurcated link 153, the upper end of which is connected by a pivot pin 154 to a pair of identical rocking straps 156 and 157. Extending through elongated slots 158 in both of the straps 156 and 157 is a cross bolt 159 having a securing nut 161 on the far end thereof so that the bolt can be clamped in any position desired along the length of the slots 158. The cross bolt 159 between the straps 156 and 157 carries an antifriction roller 162 movable in an elongated slot 163, formed in the upper end of a cast bracket 164 connected indirectly to the casing 48 of the speed unit. By loosening the nut 161 and sliding the bolt 159, the fulcrum point furnished by the bolt for the straps 156 and 157 can be changed within wide limits with respect to the position of operation of the pivot pin 154. This is illustrated diagrammatically in Figure 1 by a link 166 that can be pivotally mounted in any one of a number of pairs of apertures 167 and 168.

The ends of the straps 156 and 157 are both joined by a pivot pin 169 to the upper end of a stem 171 (Figures 1 and 5) of a device for providing a mechanism responsive to the speed or rate of operation of the main servomotor 7. This structure includes an isolated hydraulically tight casing 172 mounted conveniently on the speed unit casing 48 and containing a pair of hydraulic chambers 173 and 174. The upper chamber 173 is separated from the lower chamber 174 by a cross wall 176. The stem 171, being suitably guided in a boss 177, depends through the upper chamber 173 into the lower chamber 174 wherein it is joined by a fastening 178 to a piston 179 reciprocable axially within a short bore 181 in the cross wall 176. Excessive leakage past the piston 179 is precluded by a helical labyrinth groove 182 cut in the surface of the piston in the customary fashion. A helical coil spring 183 is seated at one end against the head of the piston 179 and at the other end against the boss 177 so that the spring urges the stem 171 downwardly.

Movement of the piston 179 in response to movement of the lever 141 and in response to the movement of the straps 156 and 157 displaces hydraulic fluid from the lower chamber 174 into the upper chamber 173, or vice versa, through a regulating orifice 184 opening from one chamber into the other through the cross wall 176. The area available for flow through the orifice 184 is variable and is regulated by a needle 186 at its upper end provided with a threaded portion 187 screwed into the top of the casing 172 and carrying lock nuts 188 so that the position of the needle can be set and held as desired. Movement of the piston 179 therefore provides variations in pressure within the chamber 174 with respect to that within the chamber 173 which is vented to the atmosphere and remains constant.

In the cross wall 176 is a bore 189 within which a piston 191 is reciprocable. The piston has a central portion 192 of substantially the diameter of the bore and has relief portions 193 and 194 extending either side of the central portion. The piston 191 is therefore responsive to pressure fluctuations within the chamber 174 when the central portion of the piston 191 is within the bore, although it is not so responsive when the relief portions permit free communication between the chambers 173 and 174. The piston 191 is mounted on a piston rod 196 extending through a boss 197 on the casing 172, there being a coil spring 198 screwed at one end to the piston 191 and at the other end screwed to a plate held by the guide boss 197 so that the spring is effective in tension and compression.

With this structure, when the piston 179 moves slowly it increases pressure within the chamber 174 slowly and the pressure is readily relieved through the orifice 184 for either direction of movement of the piston 179. Since the pressure fluctuation within the chamber 174 is then very slight, the piston 191 is substantially not affected and does not move. On the other hand, when the piston 179 is quickly moved in either direction, it produces a large pressure fluctuation within the chamber 174 as a correspondingly quick displacement of hydraulic fluid through the orifice 184 cannot occur. Consequently, a similar displacement of the piston 191 is produced, although the amount of such displacement is limited by the overrunning of the relief portions 193 and 194. Thus, for quick movements of the stem 171, the piston rod 196 is given a corresponding motion. On the other hand, for slow movements of the stem 171, the piston rod 196 moves little or not at all.

Figure 5:
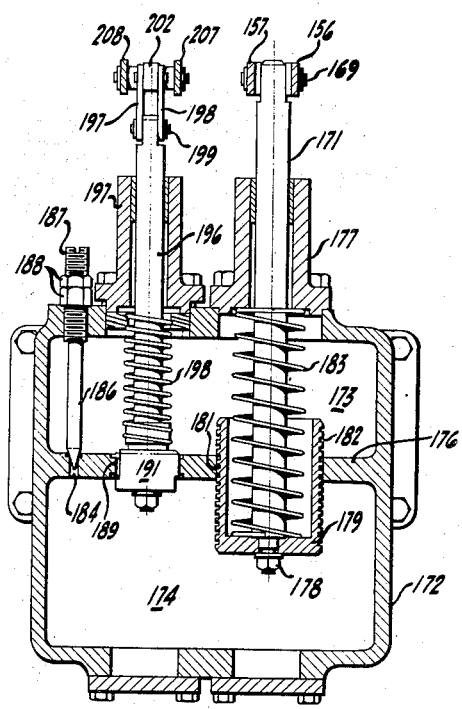
Figure 5 is a detail in cross section, the plane of which is indicated by the line 5—5 of Figure 2.

The structure within the casing 172 acts as a device responsive to the speed of displacement of the main servomotor so that fast movement of the main servomotor produces a corresponding motion of the piston rod 196, while slow motion of the main servomotor produces little or no motion of the piston rod 196. In any event, since there is free hydraulic flow from the chamber 174 to the chamber 173 and vice versa through the orifice 184, any disturbance produced by motion of the piston 179 in any part of its range is eventually compensated by flow through the orifice 184. Normally, the piston 191, after some time has elapsed following a disturbance, occupies its central position, as shown in Figure 5, since the spring 198 is fastened at both ends and tends to maintain the piston 191 in its neutral position.

The motion of the piston rod 196 is transmitted through links 197 and 198, appropriately fastened by pivot pins 199 and 201, to a lever 202 at its far end provided with a fulcrum pin 203. Between its ends, the lever 202 passes through a fork 204 at the upper end of the valve body 98, being fastened thereto by a pin 206. By these connections, rapid movement of the main servomotor 7 is effective to impart an impulse to the valve body 98 and to press upon the valve body to move it in a direction to counteract the original governor motion which initiated the rapid motion of the main servomotor.

The fulcrum pin 203 is not fixed but rather it is mounted between twin levers 207 and 208 which are generally urged toward the speed unit housing 48 by a coil spring 209 at one end fastened to a fin 211 projecting from the cap 86 and at the other end hooked over a connecting spool 212 spanning the levers 207 and 208. The floating levers 207 and 208 at one end are connected by a hinge pin 213 to a pair of transfer levers 214 and 216 arranged in parallel.

It is desired to provide a fixed point of pivoting for the transfer levers and to make that point adjustable at the will of the operator. For that reason, the levers 214 and 216 are spanned by a pivot pin 217 to which is connected a pivot rod 218 extending to a pivot connection 219 on a mounting lever 221. A pin 222 connects one end of the mounting lever to the fin 211, while the other end of the mounting lever 221 is connected by a pin 223 to the upper end of a datum rod 224. At its lower end, the datum rod rests in a cup 226 on the top of a support plate 227 for the speed unit 48. A cap 228 screws onto an intermediate threaded portion 229 of the datum rod. The cap 228 rests in the cup 226 partly under the urgency of the spring 209. The combined length of the cap 228 and the rod 224 is adjusted by the operator to hold the lever 221 in any adjusted position. This serves through the link 218 to furnish a datum point at the pivot pin 217 for the levers 214 and 216.

The speed adjusting structure is diagrammatically illustrated in Figure 1. The fulcrum pin 217 is there shown as connected to a translatable link 231 confined by a guide 232, fixed with respect to the framework. At its end the link 231 is in sliding engagement with a pin 233 on a disc 234 mounted on a shaft 236. A hand revolved gear wheel 237 meshes with and rotates the gear disc 234, the position of which is shown by a geared follower 238 moving an indicating needle 239 over a scale 241. When the gear 237 is rotated, the pivot point 217 is raised or lowered and the indicator needle 239 shows the speed for which the governor mechanism is set. By the structures of Figures 1 or 3, the standard or base speed of the unit can be changed at any time. With other points substantially in the same position, changes in the location of the pivot point 217 produce corresponding changes in the effective length of the spring 209 and a corresponding change in the load of such spring upon the valve body 98.

The levers 214 and 216 are not only connected to the pins 213 and 217, but in addition have another function and motion. These levers are joined by a pivot pin 242 to a link 243, in turn pivoted to a lever 244. A fulcrum link 245 is connected by pivot pins 246 and 247 in any opposite two of a series of apertures in the lever 244 and in an extension 248 on the cap 121. The end of the lever 244 carries a roller 249 bearing on the upper end of the valve stem 26. The motion of the valve stem 26, in response to the operation of the pilot servo 122, is effective to produce a similar motion of the lever 244 which is transferred back through the lever 214 and its accompanying structure to be effective upon the valve body 98 so that the motion of the pilot servo in response to the pressure existing in the pressure conduit 116 (in turn dependent upon the speed position of the flyball governor) is impressed upon the valve stem 98 of the governor to provide a corresponding and compensating counteracting force and possible motion.

It is often desired to permit the speed of the rotating mechanism to be reduced in an established amount with increase in load. That is, rather than maintain a set or standard speed under increasing load, it is desired to conserve the driving water and permit a small decrease in the rotational speed or velocity of the water wheel and main generator. For that reason, the twin levers 207 and 208 are provided with a special mechanism for establishing the droop characteristics. At their ends opposite the pivot pin 213, the levers 207 and 208 are joined by a pivot pin 251 (Figures 1, 2, 3 and 6). Depending from the pin 251 is a link 252 at its lower end bifurcated to straddle a roller 253 held in position by a pivot pin 254. The pin 254 also secures in position a pair of links 256 and 257 connected by a pin 258 to a crank arm 259 extending from a shaft 261 mounted in the bracket 164. Also connected to the shaft 261 is an arm 262 joined through a flexible connector 263 to a geared setting dial 264 driven through gear teeth by a manual adjusting pinion 266 and having a geared indicator 267 operating over a scale 268. When the pinion 266 is rotated, the disc 264 through the connector 263 rotates the shaft 261 and causes the roller 253 to swing or traverse about the pin 251 as a virtual pivot.

Figure 4:
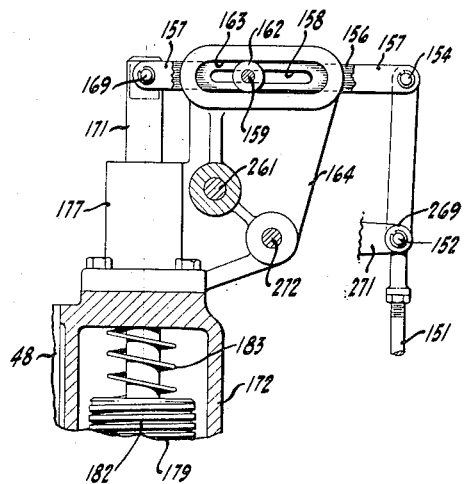
Figure 4 is a detail in cross section, the plane of which is illustrated by the line 4—4 of Figure 2.

This traversing movement of the roller 253 is utilized to effectuate a change in the droop characteristic of the governor. The pivot shaft 152, which secures the rod 151 to the link 153, also engages the end 269 of a cam lever 271 carried on a shaft 272 (Figure 4) in the bracket 164. In one position of the parts, the shaft 272 is coaxial with the pivot pin 254. Projecting from the cam lever 271 beneath the roller 253 is a cam track 273 having a generally inclined rectilinear contour with a central groove 274 engaging and guiding the roller 253.

Figure 3:
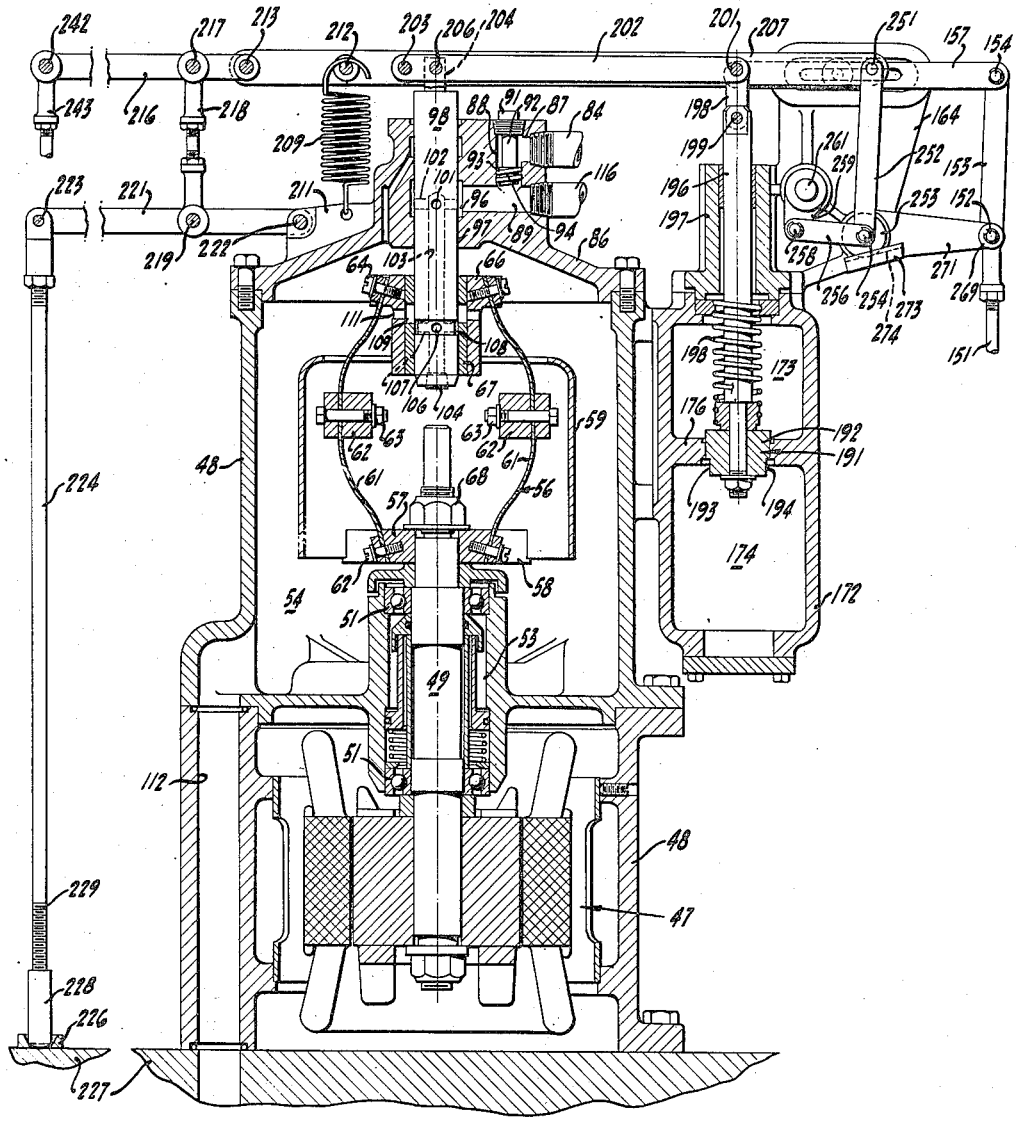
Figure 3 is a cross section, the plane of which is indicated by the line 3—3 of Figure 2.

In the position of the parts shown in Figure 3, for example, operation of the rod 151 in response to movement of the main servo motor merely rocks the cam track 273 about the center pin 254 of the speed droop mechanism and produces no displacement whatsoever thereof. There is consequently in this disposition of the parts no speed droop with load increase. However, when the shaft 261 is rotated, for example, by means of the pinion 266, the links 256 and 257 come into operation and the roller 253 is moved along the cam track 273 to be displaced from the center of rotation of the lever 271. Then, when the rod 151 moves in response to movement of the main servomotor, there is provided a corresponding rising or falling movement of the roller 253 and consequently, through the link 252, a rising or falling movement of the ends of the levers 207 and 208.

This motion of those levers is effective to change the position of the pivot 203 and also of the valve body 98 in a corresponding amount to reinforce the previous motion of the flyball governor. The amount of speed droop effective is directly proportional to the distance of the roller pin 254 from coaxiality with the rotational center 272 of the speed droop lever 271. The inclination of the cam 273 determines the gate opening at which the speed droop may be changed without automatically changing the speed level setting. The proportion shown permits changing speed droop setting with the governor at the zero load position without resulting in a change of speed.

The governor instrumentalities so far described are those necessary or desirable to provide the usual operating characteristics. Because of these elements, it is also possible to provide in addition certain other functions.

Sometimes the electrical load on the system being supplied by the generator driven by the governed water wheel goes off suddenly due to accident. It is desired promptly to shut down the main generator unit and stop the shaft 6, or at least keep it from running away. For that reason, there is connected into the main electric line in a regular fashion, by means of conductors 281 and 282, a solenoid mechanism 283. The core 284 of the solenoid has a latch 286 which engages a pin 287 on a lever 288, suitably anchored through a swing link 289 to the housing 78. The lever 288 when latched, as shown in Figure 1, sustains the rod 291 of a valve spool 292 operating in the bore 81 and urged in a downward direction by a coil spring 293.

In the position of the valve shown in Figure 1, the pressure fluid in the line 74 extends to the lines 83 and 84 and supplies the governor. As soon, however, as the current in the conductors 281 and 282 fails, the spring 293 is effective to lower the lever 288 and to run the solenoid latch over a bar 294 on a reset lever 296. As the lever 288 swings downwardly, the valve spool 292 rides over the inlet port 77 and blocks it and simultaneously connects the port 82 with a drain line 297 extending to the sump tank 36. All pressure in the governor pressure line 84 is thus immediately reduced to atmospheric and the spring 124 is then effective to move the pilot servo 122 and the regulating valve stem 26 in such a direction that pressure fluid from the line 32 is directed into the line 14 and to the chamber in the master servomotor which closes the gates or nozzle on the water wheel.

The movement of the valve spool 292 also uncovers a port 301 in the body 78 and connects it with a discharge port 302 leading to drain so that a connecting conduit 303 joined to the pressure conduits 116 and 117 is also opened. It is not necessary therefore to wait for the pressure fluid to drain through the restricted orifice 94 but both the pressure supply line 84 and the pressure passages 116 and 117 are immediately dropped to atmospheric pressure. As soon as the circuit, including the conductors 281 and 282, is in serviceable condition and the solenoid 283 is again energized, a manual operation of the reset lever 296 permits the latch 286 to swing under the pin 287. At the same time, a rod 304 at the end of the reset lever swings to butt against the lever 288 and to lift it and the valve spool 292 back into their former positions. This compresses the spring 293 and upon return of the reset lever permits the pin 287 again to latch in the solenoid latch hook, thus restoring all the parts to their previous positions. The hydraulic lines again build up to their operating pressures.

Sometimes, as a special safety measure, it is desired to lock the main servomotor in the gate or valve closed position after the water wheel has once been shut down in order that it can not be started again without some supervisory or manual intervention. For that reason, there is provided a special latch mechanism which includes a valve body 311 having a central bore 312 therein in which a valve spool 313 reciprocates. One end of the valve spool is subject to pressure within the pressure line 83 through a connection conduit 314 joined to the pressure line 83 and extending to a junction in the housing 311. The pressure on the valve stem is resisted by a spring 316 so that when the pressure is relatively low the valve spool is translated to the left in Figure 1, and when the pressure in the line 314 is at its normal operating value, the valve spool 313 is in an intermediate position as shown. The valve spool is effective to control flow through the housing 311 of hydraulic fluid taken from a supply pipe 317 which joins the pipe 32 near the pressure tank 33.

In the position of the parts shown, pressure fluid passes through the spool chamber 312 and through a port 318 into an auxiliary cylinder 319 in which a piston 321 is mounted to reciprocate. The piston rod 322 connects with a bell crank latch 323 mounted on a pivot 324 on the main servomotor. The latch end 325 is so retained out of the path of a latch socket 326 on the clevis 9 of the main servomotor piston rod 8. The high pressure exerted on one end of the piston 321 is normally unopposed as the other side of the piston communicates through a passage 327 with the bore 312 behind the spool valve 313 and with a port 328 opening to an atmospheric pressure drain.

Whenever the current goes off in the solenoid 283 and the valve spool 292 is forced downwardly to open the pressure line 83 to drain through the port 297, the conduit 314 is likewise connected to drain and the pressure on the end of the valve spool 313 is reduced. The spring 316 is then effective to translate the valve spool 313 into its other extreme position. This blocks off the atmospheric drain 328 and directs flow from the pressure line 317 through the port 327 and causes a corresponding translation of the piston 321. This motion is permitted as, after the shift of the spool 313, the port 318 is connected through the bore 312 with an atmospheric drain port 329. When the valve spool 292 drops, the port 77 is blocked so that adequate pressure remains in the system to actuate the piston 321.

The motion of the piston 321 impels the bell crank latch 325 to move into position to engage the latch lock 326 in the main servomotor piston rod clevis as soon as the piston rod is moved to its extreme lefthand position with the water wheel nozzle or valve fully closed. The parts are then locked in the the gate closed position. Depending upon the design of the latch mechanism, the latch lock can be shaped so that it can not be disengaged without manual intervention. If the latch is otherwise shaped, renewal of hydraulic pressure upon the valve spool 313 will move the latch 325 out of the latch slot 326 and operation of the structure can be resumed. Failure of the current to maintain the solenoid 283 in position therefore not only shuts down the governor mechanism and not only moves the main servomotor to closed position, but likewise makes the latch effective to hold the main servomotor in closed position.

Reduction in the normal operating pressure in the line 83 also produces another effect to preclude operation of the automatic governor mechanism. When the pressure is at its regulated high value during normal operation, it is effective upon an isolating valve controller generally designated 341. A line 342 joins the line 83 and extends through a small orifice 343 in the wall of the valve 341 and leads into a cylinder 344. Within the cylinder, there is disposed a relatively large piston 346, maintained in its uppermost position by the oil pressure beneath it, the upper portion of the cylinder being in communication with a drain through an opening 347. Joined to the piston 346 is a valve body 348 in its uppermost position having a plug 349 blocking a port 351 through which a conduit 352, being connected to the line 71, brings high pressure liquid from the tank 33. The size of the area subject to high pressure through the port 351 is so much less than the size of the area of the piston 346 upon which the reduced pressure is effective that normally the parts remain in the position shown in Figure 1.

The valve body 348, a connecting stem 353 and the piston 346 are movable downwardly into a location to block flow through a normally open drain port 354 connected through a pipe 356 to the casing 357 of a hand operated transfer valve. Within the casing 357 is a rotary plug 358 having a groove 359 therein joined to the drain circuit. Also intersecting the casing of the valve 341 is a line 361 leading into an orifice 362 blocked in the upper position of the valve body 348 but open when the valve body is in lower position. A larger port 363 connects the line 361 to drain beneath the valve body 348 when the valve body is in upper position.

Whenever the piston 346 is not sustained by adequate pressure, the superior pressure from the line 352 translates the valve body 348 downwardly thereby eventually blocking communication between the line 361 and the drain line 356 and substantially simultaneously opening flow from the port 351 through the orifice 362 and permitting pressure fluid in the line 352 to flow at a metered rate into the line 361. The speed with which this change occurs depends upon the area of the metering orifice 343.

When pressure fluid is introduced into the line 361, it flows into the cap 121 and through a passage 366 therein into an annular bore 367 within the casing 16. Within the bore is a reciprocable sleeve 368 having ports 369 in it adapted, in the uppermost position of the sleeve, to permit free communication between all of the aligned ports, such as 29 and 31, for example. When high pressure in the passage 366 is effective upon the upper end of the sleeve 368, it moves the sleeve downwardly and blocks flow through all of the aligned ports in the regulating valve 16. There can thus be no flow to or from the main servomotor through the lines 13 and 14. Whenever there is high pressure within the line 361, as a result of low pressure within the line 342, the intercepting sleeve 368 is positioned to block all of the ports in the regulating valve and thus prevents operation of any of the connected structures.

When high pressure is restored in the line 342, the piston 346 is lifted, the valve plug 349 is likewise lifted to block off the port 351 again, and the line 361 is then connected through the passage 363 without substantial restrictions to the drain line 356. Since the pressure above the intercepting sleeve in the chamber 367 consequently falls, the sleeve is restored to its open position permitting communication through all of the ports therein. This is because the step diameter 370 in the port 29 is subject to relatively high, unbalanced pressure so that the sleeve is lifted to the position shown in Figure 1 for further operation.

It is not necessary for there to be a power failure in order to close down the isolating sleeve 368. This can also be accomplished manually by rotation of the valve plug 358. A pressure line 371 joins with the line 352 and extends into the valve body 357. The plug 358 is provided with a channel so that upon rotation of the plug 358 a quarter turn clockwise, as seen in Figure 1, high pressure liquid from the line 371 flows through the plug 358 and into the line 356. Flow is then through the port 354, the port 363 and through the line 361 to displace the isolating sleeve 368. In this fashion, the regulating valve 17 can be put out of operation at any time manually. A return rotation of the valve plug 358 through a quarter turn into the position shown in Figure 1 connects the line 361 through the line 356 to drain and restores the functioning of the regulating valve 17.

In order to provide manual operation of the structure when the regulating valve 17 is not effective, there is provided a housing 381 having a valve sleeve 382 disposed in it and a valve spool 383 arranged for reciprocation in the sleeve. A pressure line 384 joins the pressure line 32 and is branched into a line 386 opening through appropriate ports to the interior of the valve, and a line 387 opening to the bottom of an annular chamber 388.

Operating in the annular chamber is an isolating sleeve 389 of different diameters. The larger diameter end of the sleeve is subject to pressure brought through a line 391 which extends to a pressure port 392 in the valve casing 357. Normally, the pressure from the line 371 travels through the line 391 and keeps the isolating sleeve 389 in its lowermost position blocking flow from the line 386 into the interior of the housing 381, despite the fact that the pressure in the line 387 is effective upon the lesser area of the lower end of the isolating sleeve. When, however, the valve spool 358 is rotated by hand in a sufficient amount, the drain port 359 is put into connection with the line 391 so that the then superior pressure communicated through the line 387 lifts the isolating sleeve and pressure is available through the line 386 on the interior of the valve housing 381.

The spool 383 is effective when axially translated to supply the pressure fluid from the line 386 either into a pressure line 393 connected to the line 13 and effective upon one end of the main servomotor piston 11 or alternatively into another pipe 394 connected to the pipe 14 and effective upon the other end of the main servomotor piston 11. When either of the pipes 393 or 394 is connected to the pressure line 386, the other of those lines communicates with appropriate drain ports leading to a drain line 396, connected by a duct, not shown, to the sump tank 36.

A spring 397 urges the valve spool 383 to follow the motion of an end roller 398 on a control lever 399 connected by a link 401 with the casing 381. The lever 399 is moved through a rod 402 extending to a balance lever 403 to which it is connected by a pivot 404. One end of the balance lever 403 has a sliding fit on a pin 406 rotatable with the gate position gear 144, while the other end of the balance lever 403 has a sliding connection with a pin 407 on a gate limit gear disc 408. This latter disc is mounted for rotation on a shaft 409, is manually set by an engaging gear 411, and operates a geared indicator 412 movable with respect to a scale 413 to show the limit of opening permissible for the main gates as established by the main servomotor.

The manual operation of the pinion 411 rotates the disc 408 so as to move the pin 407 in such a way as to displace the rod 402, the pin 406 in the meantime serving as a fulcrum. The resulting motion of the rod 402 is effective upon the valve spool 383 to open the supply of fluid under pressure to the proper ends of the main servomotor and thus provide a hand operation of the servo mechanism. As the main servomotor travels, it moves the disc 144 and compensates for the manual motion of the disc 408.

The operation of the valve plug 358 makes the isolating sleeve 368 move in an opposite direction to the sleeve 389, or at least they operate in opposite senses so that when the governor regulating valve 17 is in operation the manual regulating valve 383 is out of operation and vice versa.

The movement of the rod 402 serves not only to move the valve spool 383, regardless of the position of the sleeve 389, but serves also to operate a valve plug 416 operating in a cylinder 417 in an extension of the casing 381. The plug 416 is in alignment with a floating plug 418 urged upwardly to a precise position by a spring 419 resting on an adjusting screw 421. The floating plug 418 is pierced so that pressure fluid can flow through it. A port 422 in the casing 381 is connected through a line 423 to the line 116 and so is open to the pressure in the line 117. Pressure from the line 423 acts on the annulus at the bottom of the plug 416 and upon the annular shoulder of the plug 418. This depresses the plug 418 against the spring 419 far enough to clear the port 422. When the disc is mounted clockwise by the pinion 411, the rod 402 and the plug 416 are raised enough to lift above the plug 418. Then flow occurs from the line 423, between the separated plugs 416 and 418 and through the chamber 417 into a drain port 426 extending to the drain conduit 396. The resulting reduced pressure in the line 423 is communicated through the line 116 to the bore 119 so that the spring 124 actuates the valve piston 24. The main servomotor 7 is correspondingly moved and moves the rocker lever 141 to rotate the disc 144 counterclockwise, thus lowering the rod 402 and restoring the plug 416 to engage the floating plug 418 so pressure in line 423 and bore 119 is restored.

What is claimed is:

1. A governor for a water wheel controlled by a hydraulic servomotor comprising a valve housing having a supply conduit therein, means for supplying said supply conduit with fluid under pressure, means forming a flow restriction in said supply conduit, a valve body movable in said housing and having a valve passage therein open to said supply conduit, means movable on said valve body for controlling flow through said valve passage, a flyball governor responsive to the speed of said water wheel for moving said movable means, means forming a pressure passage open to said supply conduit between said restriction and said movable means, means for positioning said servomotor in accordance with the pressure in said passage, means for releasing pressure from said pressure passage, and means responsive to the movement of said servomotor for controlling said releasing means.

2. A governor for a water wheel controlled by a hydraulic servomotor comprising means forming a supply conduit, means for supplying said conduit with fluid under pressure, means forming a flow restriction in said supply conduit, means for releasing said fluid from said conduit, a flyball governor responsive to the speed of said water wheel for operating said releasing means, means forming a pressure passage open to said supply conduit between said restriction and said releasing means, means for positioning said servomotor in accordance with the pressure in said pressure passage, means for reducing the pressure in said pressure passage, and means for controlling said reducing means in accordance with the movement of said servomotor.

3. A governor having a structure including a cylindrical body with a circumferential groove therein, means forming an oil supply conduit opening into said groove, means forming a restriction in said conduit, a governor operated sleeve slidable on said body over said groove to form a balanced spill valve, a servo-cylinder, a piston movable in said cylinder, a gate controlling valve, means for directly coupling said piston and said gate controlling valve, a spring urging said piston in one direction, a duct extending from said conduit between said restriction and said groove to said cylinder at a point to tranfer oil pressure to said cylinder in opposition to said spring, and means for opening said duct to reduce the oil pressure therein.

4. A governor having a structure including a cylindrical body with a circumferential groove therein, means forming an oil supply conduit opening into said groove, means forming a restriction in said conduit, a governor operated sleeve slidable on said body over said groove to form a balanced spill valve, a servo-cylinder, a piston movable in said cylinder, a gate controlling valve, means for directly coupling said piston and said gate controlling valve, a gate operator, means controlled by said valve for correspondingly moving said gate operator, a spring urging said piston is one direction, a duct extending from said conduit between said restriction and said groove to said cylinder at a point to transfer oil pressure to said cylinder in opposition to said spring, means for opening said duct to reduce the oil pressure therein, and means responsive to movement of said gate operator for closing said duct.

References Cited in the file of this patent

UNITED STATES PATENTS

| | | |
|---|---|---|
| 1,234,882 | Doble | July 31, 1917 |
| 1,377,672 | Doble | May 10, 1921 |
| 1,584,602 | Bradshaw | May 11, 1926 |
| 1,685,755 | Ring | Sept. 25, 1928 |
| 1,834,773 | Fellmann | Dec. 1, 1931 |
| 2,106,684 | Ring | Jan. 25, 1938 |
| 2,228,153 | Pfau | Jan. 7, 1941 |
| 2,358,894 | Volet | Sept. 26, 1944 |
| 2,514,930 | Branham | July 11, 1950 |
| 2,615,466 | Garde | Oct. 28, 1952 |
| 2,616,397 | Ruud | Nov. 4, 1952 |

FOREIGN PATENTS

| | | |
|---|---|---|
| 18,559 | Switzerland | Feb. 9, 1899 |
| 208,139 | Switzerland | Apr. 1, 1940 |
| 212,872 | Germany | Aug. 13, 1909 |
| 233,646 | Great Britain | May 8, 1925 |
| 650,983 | France | Oct. 2, 1928 |
| 968,083 | France | Apr. 12, 1950 |
| 143,736 | Australia | Oct. 9, 1951 |